(12) United States Patent
Yang et al.

(10) Patent No.: US 8,744,859 B2
(45) Date of Patent: Jun. 3, 2014

(54) OPERATION METHOD OF INTERACTIVE REFRIGERATOR SYSTEM

(75) Inventors: Jeong-Hwa Yang, Seoul (KR); Ik-Kyu Lee, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 734 days.

(21) Appl. No.: 12/374,244

(22) PCT Filed: Jul. 20, 2007

(86) PCT No.: PCT/KR2007/003520
§ 371 (c)(1),
(2), (4) Date: Jan. 16, 2009

(87) PCT Pub. No.: WO2008/010688
PCT Pub. Date: Jan. 24, 2008

(65) Prior Publication Data
US 2009/0326957 A1 Dec. 31, 2009

(30) Foreign Application Priority Data

Jul. 20, 2006 (KR) .................. 10-2006-0068142
Sep. 28, 2006 (KR) .................. 10-2006-0094513

(51) Int. Cl.
*G10L 21/00* (2013.01)
(52) U.S. Cl.
USPC ............. 704/275; 704/270; 704/270.1
(58) Field of Classification Search
CPC ......... G10L 15/26; G10L 15/00; G10L 15/20; G10L 2015/00; G10L 2015/22; G10L 2015/223; G10L 2015/225; G10L 2015/228
USPC ............................ 704/275, 270, 270.1
See application file for complete search history.

(56) References Cited

U.S. PATENT DOCUMENTS

| | | | |
|---|---|---|---|
| 6,204,763 B1* | 3/2001 | Sone | 340/568.1 |
| 6,483,695 B1* | 11/2002 | Hartstein | 361/679.09 |
| 6,728,676 B1* | 4/2004 | Ortega | 704/270 |
| 6,993,485 B2* | 1/2006 | Ferragut et al. | 704/270 |
| 7,680,691 B2* | 3/2010 | Kimball et al. | 705/22 |
| 7,762,665 B2* | 7/2010 | Vertegaal et al. | 351/209 |
| 7,775,056 B2* | 8/2010 | Lowenstein | 62/127 |
| 2001/0036129 A1* | 11/2001 | Carr | 368/109 |
| 2004/0117274 A1* | 6/2004 | Cenedese et al. | 705/28 |
| 2007/0143127 A1* | 6/2007 | Dodd et al. | 705/1 |

FOREIGN PATENT DOCUMENTS

| | | | |
|---|---|---|---|
| JP | 14-081849 A | | 3/2002 |
| JP | 15-202180 A | | 7/2003 |
| JP | 2003202180 A | * | 7/2003 |
| KR | 10-0159625 B1 | | 1/1999 |
| KR | 10-0198703 B1 | | 3/1999 |
| KR | 10-2000-0015692 A | | 3/2000 |

* cited by examiner

*Primary Examiner* — Qi Han
(74) *Attorney, Agent, or Firm* — Birch, Stewart, Kolsch & Birch, LLP

(57) ABSTRACT

An operation method of an interactive refrigerator system, includes displaying information about stored items corresponding to a speech input by a user, generating and outputting a response message for the information about the stored items, checking whether or not storage periods of the stored items are expired; and outputting expiration information about storage periods of the stored items or expected expiration information about storage periods of the stored items.

4 Claims, 10 Drawing Sheets

OPERATION METHOD OF INTERACTIVE REFRIGERATOR SYSTEM

TECHNICAL FIELD

The present invention relates to a refrigerator, and more particularly to an operation method of an interactive refrigerator system.

BACKGROUND ART

In general, a user manually must input a plurality of food names through an input unit such as a keyboard so as to input information about foods to be stored in the refrigerator, and then the refrigerator stores information about the corresponding food based on the food names which were manually inputted by the user. In addition, the user may manually input food names through the input unit to obtain information about foods being kept in the refrigerator, and then obtains information about the corresponding food based on the food names which were so manually inputted.

However, a related art refrigerator has an inconvenience in requiring a user to manually input a plurality of food names through an input unit such as a keyboard.

In addition, the related art refrigerator requires an input unit such as a keyboard to be provided in the refrigerator, thereby increasing the manufacturing costs of the refrigerator.

Further, in the related art refrigerator, an input is performed through an input unit such as a keyboard, thereby increasing the time required to perform the input operation.

DISCLOSURE OF THE INVENTION

Technical Problem

Therefore, an object of the present invention is to provide an operation method of an interactive refrigerator system which allows a user to input information by speech.

Another object of the present invention is to provide an operation method of an interactive refrigerator system which allows a user to easily identify a speech recognition result, by providing to the user a response message corresponding to a speech input through an avatar taking a particular shape or making a particular gesture.

Another object of the present invention is to provide an operation method of an interactive refrigerator system which allows a user to easily manage stored items, by providing information about the stored items to the user in advance through an avatar taking a particular shape or making a particular gesture.

To achieve these and other advantages and in accordance with the purpose of the present invention, as embodied and broadly described herein, there is provided an operation method of an interactive refrigerator system, including: displaying information about stored items corresponding to a speech input by a user; generating and outputting a response message for the information about the stored items; checking whether or not storage periods of the stored items have expired; and outputting expiration information about the storage periods of the stored items or expiration information about the expected storage periods of the stored items.

There is also provided an operation method of an interactive refrigerator system, including: inputting information about stored foods by speech signal and displaying information about the stored items corresponding to the inputted speech signal; abstracting a valid period from the information about the stored items and checking whether or not the abstracted valid period is expired; and generating and displaying a food information list window to display corresponding food-related information based on whether the valid period is expired.

MODES FOR CARRYING OUT THE PREFERRED EMBODIMENTS

Description of the preferred embodiments of an operation method of an interactive refrigerator system, which outputs a response message corresponding to a speech input or performs a control function corresponding to the speech input to answer the performance result in a spoken voice, thus to enable a user to easily manage stored items, will be given in detail with reference to FIGS. 1 through 14.

Figure 1:
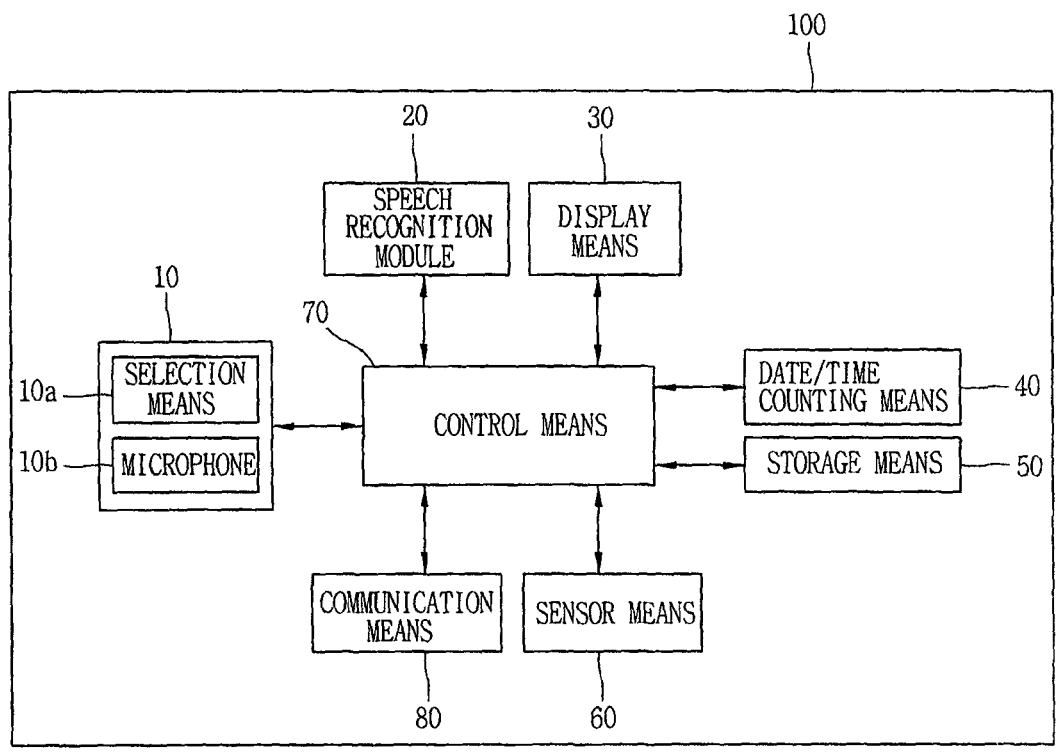
FIG. 1 is a schematic block diagram showing the structure of an information management device applied to a refrigerator according to one embodiment of the present invention.
Figure 2:
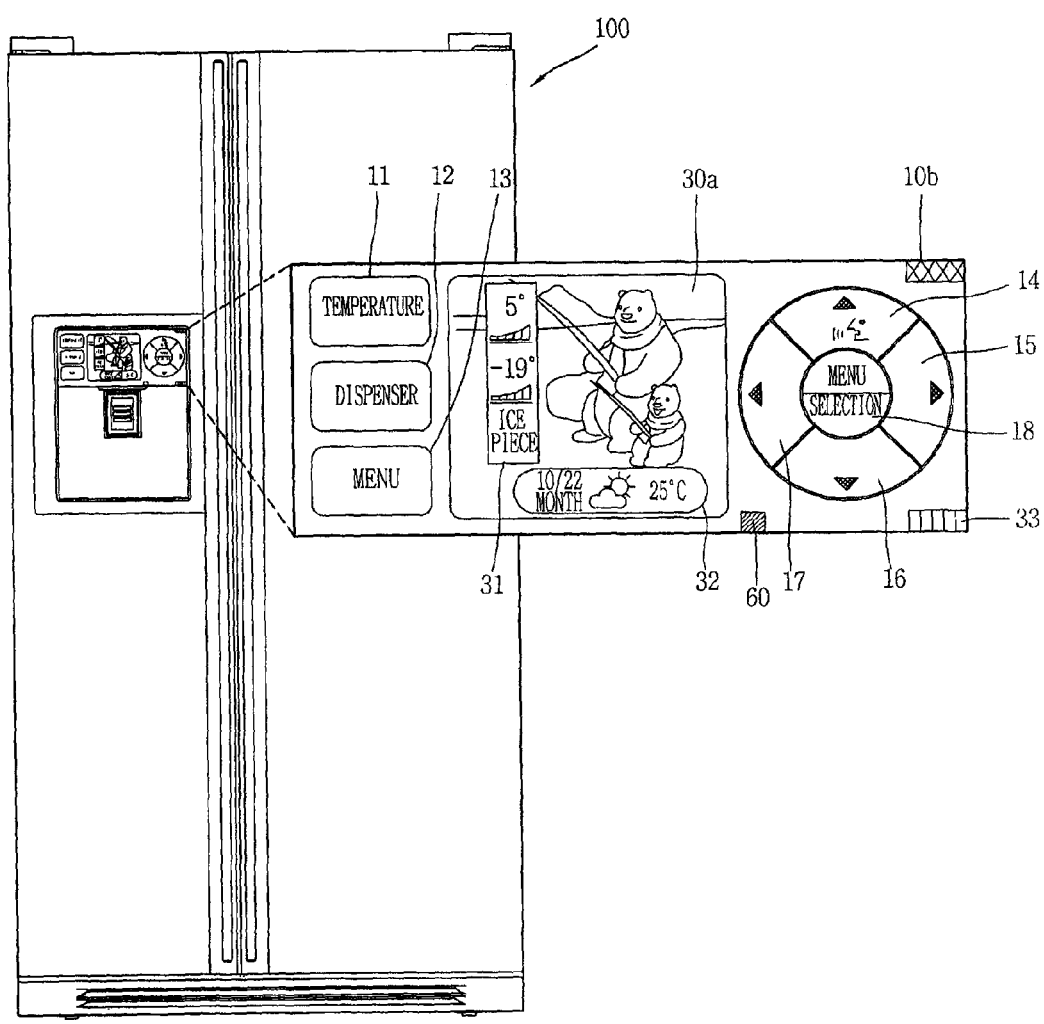
FIG. 2 is a front view of a refrigerator in FIG. 1 and an enlarged view of a portion thereof.

FIG. 1 is a schematic block diagram showing the structure of an information management device applied to a refrigerator according to one embodiment of the present invention. FIG. 2 is a front view of a refrigerator in FIG. 1 and an enlarged view of a portion thereof.

As shown in FIG. 1, a refrigerator 100 according to the present invention includes an input means 10 for inputting of a certain speech from a user; a speech recognition module 20 for identifying information corresponding to the user's inputted speech; a display means 30 for displaying frames (e.g., a user interface, etc.) to be displayed for an information management service, information, and the like; a date/time counting means 40 for setting a date and/or time; a storage means 50 for storing the frames to be displayed for the information management service, information, and the like; a sensor means 60 for generating a signal sensing a user's approach; a control means 70 for controlling the above-mentioned components and also a communication means 80 to be described below, being inputted information about stored items kept in the refrigerator by a user's speech, and identifying the inputted information so as to allow the user to check, store and manage the inputted information; and the communication means 80 for transmitting a speech signal outputted from the refrigerator 100 to the user, or receiving refrigerator-related control commands from the user. Further, the control means 70 may perform a freezing and/or cooling control operation of the refrigerator 100. In addition, the refrigerator 100 may include a power supply means (not shown) to supply power required by each component.

The input means 10 is a means for inputting of commands from the user (e.g., for general operation control of the refrigerator, starting and stopping of a speech recognition mode, information addition, information search, information deletion, avatar selection, etc.).

The input means 10 includes a selection means 10a displaying frames, etc. through the display means 30, such as a button-type, a touch pad-type or an electrostatic-type, and a microphone 10b for sensing a speech signal from a user.

As shown in FIG. 2, the selection means 10a includes a temperature setting means 11 for setting the temperature of freezing and cooling chambers, a dispenser setting means 12 for setting a service type of a dispenser (ice cubes, water, ice pieces, etc.), a menu means 13 for activating and selecting a user interface displayed on the display means 30, a speech recognition selection means 14 for starting or stopping a speech recognition mode, selection means 15, 16, 17 for other options (e.g., activation of a refrigerator lamp, locking/unlocking of the input means 10), and a menu/selection button 18 for checking and selecting information displayed on the display means 30.

The microphone 10b is mounted on a front surface of the refrigerator 100 to easily pick up a user's speech. In addition, considering that the user performs an operation, such as information input, in an area where the display means 30 is mounted, the microphone 10b may be mounted at one side of the display means 30.

The speech recognition module 20 is provided with the user's speech (or speech signal) from the microphone 10b under the control of the control means 70 to convert the speech into information (e.g., text, numbers, characters, and the like) corresponding to the provided speech, thereby identifying the provided speech. The speech recognition module 20 may be implemented by one or more of a hardware implementation, a software implementation and a firmware implementation. The speech recognition module 20 transmits the identified information to the control means 70, then under the control of the control means 70, the transmitted information is displayed on the display means 30 as text or numbers or is outputted on the display means 30 by converting a response message corresponding to the transmitted information into speech.

Preferably, the display means 30 is a color TFT LCD to display at least one or more of a user interface, an avatar and information. The user interface may be a background on which the avatar is displayed. Further, the user interface, together with or separate from the avatar, may additionally display information about the refrigerator's condition. That is, as shown in FIG. 2, the display means 30 displays an avatar (bear picture) 30a as a standby screen and basic information to 31 of the refrigerator, and additionally displays weather information (or the weather conditions of the day) 32.

The display means 30 may also include an audio output means 33 as well as the visual display means as mentioned above. That is, for the audio output means 33, a loud speaker may be used. In addition, when a user clicks a button (not shown) for requesting the refrigerator's current status information, the audio output means 33 outputs a speech corresponding to the refrigerator's pre-stored status information through the audio output means 33, in addition to the avatar information displayed on the display means 30.

Further, when a preset time interval elapses or the refrigerator's status information is changed, the audio output means 33 may output a speech corresponding to the refrigerator's pre-stored status information for informing the user of the current status information of the refrigerator, in addition to the avatar information displayed on the display means 30.

When the sensor means 60 senses a user approaching around the refrigerator, the audio output means 33 may be configured to output a speech corresponding to the refrigerator's pre-stored status information for informing the current status information of the refrigerator.

The audio output means 33 may output a response message corresponding to a control result of the refrigerator by the control means 70 or to a speech inputted through the microphone 10b, using the combination of conversational sentences or words that are pre-stored.

When speech is inputted from the microphone 10b or when a control command such as for storage is received from a user, the date/time counting means 40 calculates time-related information such as a date and/or time, and the like. And, if the control means 70 makes a request for time-related information, the date/time counting means 40 provides the control means 70 with time-related information of the time point when the request has been received.

The storage means 50 stores at least one or more information of frames (user interface) to be displayed to provide an information management service provided by the refrigerator 100 to a user, information composed by the control means 70, avatar data and a voice message corresponding to the refrigerator's status information. The frames refer to a user interface screen, which helps the user to easily manage information. Here, the information includes the names of stored items, starting dates of storage or storage period/days or valid period, quantity, and the like. Further, the storage means 50 stores an avatar images to be displayed on an initial screen, etc. to allow the user to select there among. The storage means 50 also stores avatar images representing stored items to help a user to easily identify the stored items.

The sensor means 60 is a sensor for sensing that a user approaches near to the refrigerator, and as shown in FIG. 2, is mounted near the display means 30 on the front surface of the refrigerator. The sensor means 60 transmits a sensing result to the control means 70.

The control means 70 controls an entire freezing/cooling process and additionally provides an information management service, as will be described below. The control means 70 includes at least one or more central processing units (not shown), and may include the storage means 50 or may include only a processor such as a central processing unit, etc. Here, the control means 70 and the storage means 50 are explained as separate elements in this specification to describe data stored in the storage means 50 in detail.

To manage information about stored items, the control means 70 performs a speech recognition mode and obtains a user's speech through the microphone 10b, thereby obtaining information corresponding to the user's speech obtained by the control of the speech recognition module 20. The control means 70 provides the information management service, such as an information storage mode, an information search mode, an information deletion mode and an information notification mode. This information management service is performed in the speech recognition mode, and may be configured to perform the information management service in response to a user's input performed through the selection means 10a, not by speech.

The information storage mode refers to a mode in which the control means 70 stores information obtained through the microphone 10b. The information search mode refers to a mode in which the control means 70 reads information stored in the storage means 50 to allow the user to find desired information among the thusly read information. The information deletion mode refers to a mode which enables the user to delete at least a portion among the information stored in the storage means 50. And, the information notification mode is a mode in which the control means 70 reads information stored in the storage means 50 and provides the user with information about stored items having a valid storage period that has expired, based on time-related information obtained by the date/time counting means 40. The above-mentioned information storage mode, information search mode and information deletion mode are performed depending on a user's input. The information notification mode is a service that is automatically provided by the control means 70 after the information notification mode has been selected by the user or after it has been automatically selected.

For instance, the speech recognition selection means 14 may be selected to start the speech recognition mode. Then, if an item to be stored in the refrigerator is milk, the user may speak into the microphone 10b, saying <milk> or <Seoul milk> along with its brand name. The speech input is performed by inputting words to the extent that the user can identify the stored items. Here, without being limited to the words used to input, words may be inputted through various modifications.

The inputted speech <milk> is converted into character information for <milk>, which is the information corresponding to the inputted speech by the speech recognition module 20, and then is transmitted to the control means 70. The control means 70 displays the transmitted character information for <milk> on the display means 30. In addition, a speech corresponding to the character information for <milk> may be outputted through the audio output means 33 under the control of the control means 70.

When the user checks the characters displayed on the display means 30 and selects a <cancel> button (not shown), a text or speech prompt requesting the user to re-input the speech is outputted through the display means 30 or the audio output means 33 under the control of the control means 70.

Also, when the user checks the characters displayed on the display means 30 and then selects the <menu/select> button 18, the control means 70 stores the characters displayed on the display means 30 into the storage means 50. Here, the storage means 50 may also store the current time provided by the date/time counting means 40 as well as the characters.

After the <menu/select> button 18 has been selected, the user is prompted, through the display means 30 or the audio output means 33 under the control of the control means 70, to input a storage period and/or a valid period for the stored item. If the user inputs the storage period and/or valid period through speaking, the information converted by the speech recognition module 20 is transmitted to the control means 70. Accordingly, the control means 70 outputs the transmitted information through the display means 30 or the audio output means 33. After the outputted information undergoes a user confirmation process (in case the user selects the <menu/select> button 18), the control means 70 stores the characters displayed on the display means 30 in the storage means 50. Then, quantity information is inputted through the input means 10, and is then stored in the storage means 50 after the inputted quantity has been checked.

Once a stored item selection process for a particular stored item and a storage period and/or valid period setting process are completed, the control means 70 manages information about the items stored in the storage means 50 (e.g., food name: <milk>, quantity: <1>, storage period: 30 days, valid period: Jul. 31, 2007).

The control means 70 provides the user at least one or more notifications through the display means 30 about the expiration date of the storage period prior to a predetermined notification period with respect to the storage period.

For instance, if the storage period is valid until Jul. 31, 2007 and a predetermined notification period is set to 7 days, a notification indicating that the storage period of the stored item will expire in 7 days is provided to the user through the display means 30 on Jul. 24, 2007, 7 days prior to Jul. 31, 2007.

For example, a speech saying <please note that the storage period of milk stored from Jul. 1, 2007 remains 7 days>, is outputted through the display means 30 or the audio output means 33. Here, <Jul. 1, 2007> and <milk> are information stored in the storage means 50 after being inputted in the speech recognition mode, <7 days> is a pre-stored value in the storage means 50 as a notification period predetermined by the user, and <stored from>, <storage period of > and <please note that . . . remains . . . > are phrases pre-stored in the storage means 50 by default.

The communication means 80 may convert the speech signal outputted from the refrigerator 100 into a wireless or wired communication signal, and transmit the thusly converted signal to a third party user.

And, the communication means 80 may also be configured to receive refrigerator-related control commands from the user via a wireless or wired communication signal and to input the received signals to the refrigerator 100. The control means 70 analyzes the signals inputted to the refrigerator 100, performs a control operation corresponding to the analyzed information, and then outputs a speech signal corresponding to the performance result through the display means 30.

Hereinafter, the operation method of the interactive refrigerator system according to a first embodiment of the present invention will be described in detail with reference to FIGS. 1 and 2.

Figure 3:
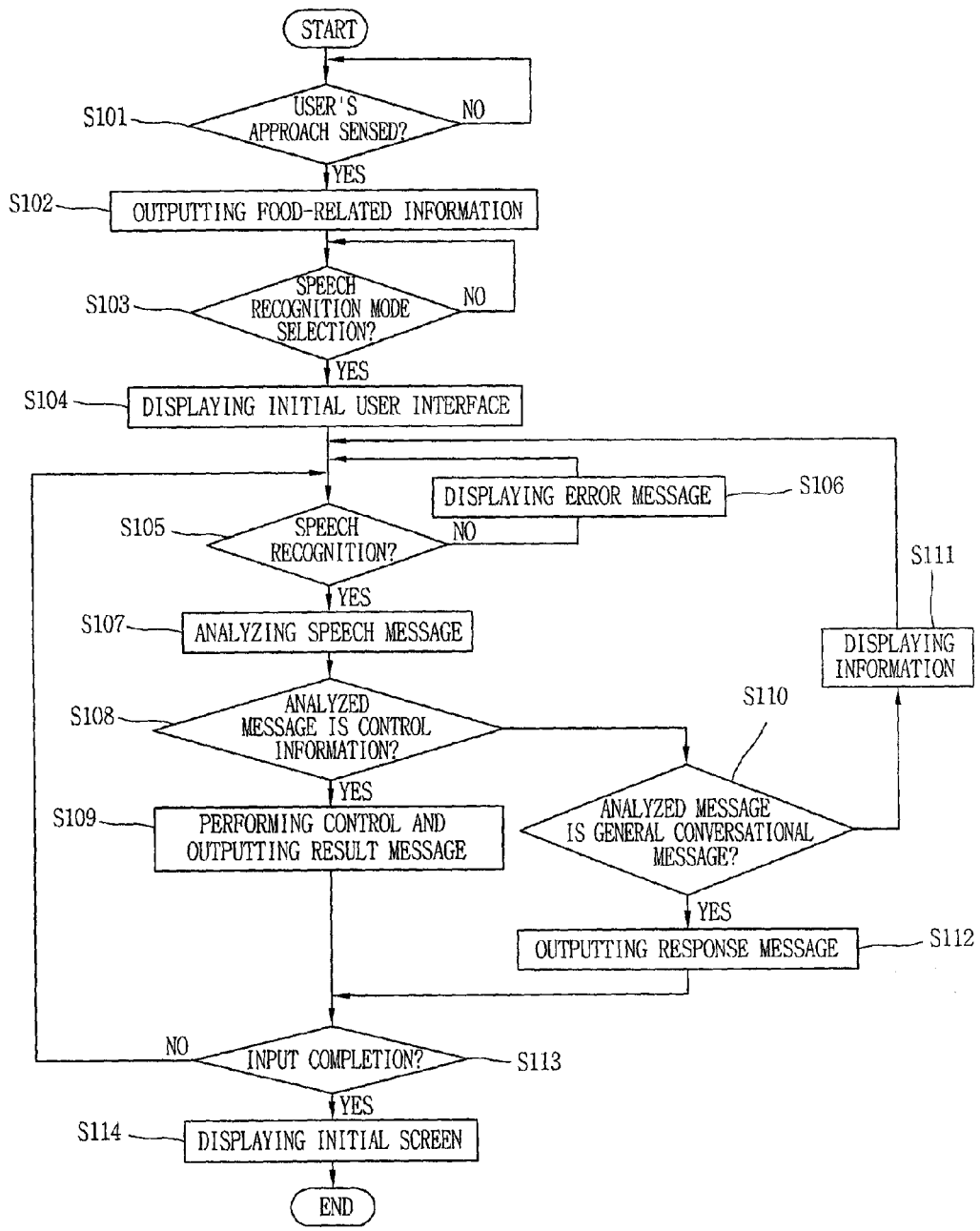
FIG. 3 is a flowchart showing an operation method of an interactive refrigerator system according to a first embodiment of the present invention.

FIG. 3 is a flowchart showing the operation method of the interactive refrigerator system according to the first embodiment of the present invention.

First, the sensor means 60 attached to the refrigerator 100 senses whether a user approaches near to the refrigerator. According to the sensing result, if the sensor means 60 does not sense a user's approach, a standby mode is maintained, but if the sensor means 60 senses a user's approach (S101), sensing of the user's approach is transmitted to the control means 70. Then, the control means 70 converts information about any food having an expired storage period into preset speech signals so as to output a notification thereof as a speech signal through the audio output means 33 or to display same visually through the display means 30.

Further, when the information about foods is outputted, it may be configured to output information about foods that have a certain remaining valid storage period pre-set by the user as well as information about any foods whose storage periods have expired, through the display means 30 to the user (S102).

Then, the control means 70 determines whether the speech recognition mode is selected through an input of the speech recognition selection means 14 by the user's manipulation (S103).

According to the determination result, if the speech recognition mode is selected, the control means 70 displays an initial user interface for the information management service on the display means 30. The initial user interface may use a predetermined avatar, which displays a text such as the phrase <a speech recognition mode will start> or outputs a pre-stored speech corresponding to the phrase (S104).

Then, the user's speech is inputted to the control means 70 through the microphone 10b.

To check whether or not there is an error in the user's inputted speech, the inputted speech is converted into corresponding information (e.g., text, numbers, characters, etc.) through the speech recognition module 20. If the conversion was able to be performed normally, the user's inputted speech is determined to have no error and a next step (S107) is then performed. If the conversion was not performed normally, the user's inputted speech is determined to have an error.

The control means 70 displays a text <please say that again> to the user through the display means 30, displays the text using an avatar or outputs a pre-stored speech corresponding to the text (S106) so as to request inputting of a speech from the user again.

Further, the control means 70 may display to the user through a shape or gesture of the avatar, whether or not the user's inputted speech has an error. For instance, it may be configured that a smiling avatar represents that there was no error in the user's inputted speech, and a crying avatar represents that there was an error in the user's inputted speech (S105).

When there was no error in the user's inputted speech, the speech recognition module 20 converts the user's speech input into information corresponding to the speech. Based on the thusly converted information, information about the items stored in the refrigerator may be analyzed, and then the analyzed result may be transmitted to the outside through the communication means 80.

In addition, the control means 70 analyzes the information converted by the speech recognition module 20 or the refrigerator-related control command, received from the user through communication means 80 and then transmitted to the control means 70.

Here, the inputted speech message may include at least one or more data of the name of a stored item, quantity, valid period, storage period and refrigerator-related control commands (S107).

According to the analysis result, it is determined whether the transmitted information or the control command is a freezing/cooling operation control command or information (S108).

According to the determination result, if the transmitted information or the control command is a freezing/cooling operation control command or information, a control function corresponding to the freezing/cooling operation control command or information is performed. The result of the control function performance is converted into a pre-stored speech or a text corresponding to the result of the control function performance, and then is outputted through the display means 30.

For instance, if the transmitted information or the control command is <store>, the control means 70 stores a current condition, and converts the stored result into a speech or a text corresponding to the stored result, and then outputs the result through the display means 30 (S109).

As a result of the determination, if the transmitted information or the control command is not a freezing/cooling operation control command or information, it is determined whether the transmitted information is a general conversational message.

Here, control commands relate to the control of the freezing/cooling cycle of the refrigerator, control of the information management service, etc., such as <store>, <search>, <delete>, <cancel>, <complete>, <store all>, <view all>, <store complete>, <confirm>, and the like. Also, general conversational messages, which are not the control commands, relate to the names of stored items, quantity, valid period, storage period, etc., such as <freezing chamber>, <cooling chamber>, <strawberry>, <3 days>, <Jul. 1, 2007>, <beef>, <2 kg>, and the like (S110).

If, according to the determination result of the above step (S110), the transmitted information or the control command is not a general conversational message, a speech or a text corresponding to the inputted message is generated and outputted through the display means 30 thus for the operation to proceed to the speech input step (S105) (S111).

Otherwise, if, according to the determination result of the step (S110), the transmitted information is a general conversational message, a response message corresponding to the inputted message is generated as a speech or a text, thereby outputting the generated speech or text through the display means 30.

Here, to generate a response message corresponding to the inputted message, at least one or more conversational sentences or words are stored in the storage means 50 in advance. The control means 70 generates a speech or text as an appropriate response message corresponding to the inputted message, by using the at least one or more conversational sentences or words stored in the storage means 50.

In addition, when the response message corresponding to the inputted message is generated, the control means 70 calculates the storage period or valid period of the stored item based on the analysis result and displays the calculated result on the display means 30. The control means 70 then checks whether or not the storage period/valid period of the stored item have expired, and then visually displays expiration information of the storage period or valid period of the corresponding stored item through the display means 30 or outputs such information as a speech signal through the audio output means 33 on the storage expiration date or valid period expiration date.

Further, the control means 70 checks whether or not the storage period/valid period of the stored item have expired. Considering an expected expiration notification date preset by a user for the storage period/valid period of the stored item, the control means 70 visually displays the expiration information of the storage period or valid period of the corresponding stored item through the display means 30, or outputs such information as a speech signal through the audio output means 33 prior to the expected expiration notification date preset by the user from the storage period/valid period of the stored item.

For instance, if the expected expiration notification date preset by the user is set to 7 days, then, on a date prior to 7 days from the expiration date of the valid period of the stored item, the valid period expiration information of the corresponding stored item is visually displayed to the user through the display means 30, or is outputted as a speech signal through the audio output means 33. Accordingly, the user is notified in advance prior to the expiration date of the valid period, thereby facilitating management of the stored item.

Further, the user's inputted speech is recognized, and as a result of the recognition, if the inputted speech is food-related information, the food-related information is analyzed. Then, an avatar of pre-stored shape or gesture having characteristics conforming to the analysis result is generated to be visually displayed through the display means 30 (S112).

In steps (S101) through (S112), the information displayed through the display means 30 may be transmitted to the outside through the communication means 80.

Hereafter, the control means 70 determines the input completion according to whether the user has completed inputting through the input means 10 or whether there is a speech input from the user during a preset time period (S113).

If, as a result of the determination in step (S113), input from the user is determined as being continued, the speech input step (S105) proceeds.

However, if, as a result of the determination in step (S113), the input from the user is determined to have been completed, the control means 70 stops the information management service and then displays the preset initial screen on the display means 30 (S114).

The operation method of the interactive refrigerator system according to a second embodiment of the present invention will be described in detail with reference to FIGS. 1 and 2.

Figure 4:
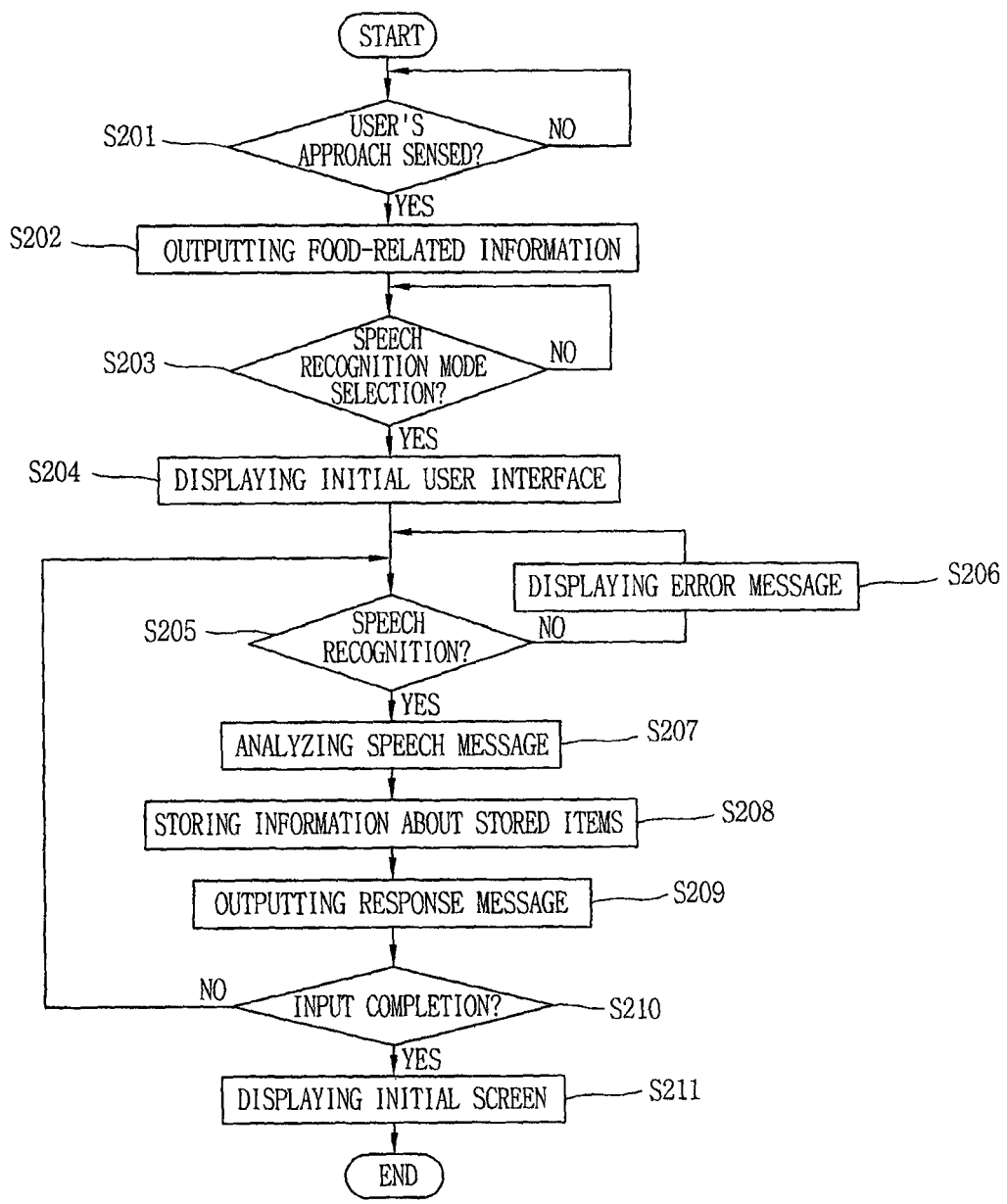
FIG. 4 is a flowchart showing an operation method of an interactive refrigerator system according to a second embodiment of the present invention.

FIG. 4 is a flowchart showing the operation method of the interactive refrigerator system according to the second embodiment of the present invention.

The steps (S201) through (S207) correspond to the steps (S101) through (S107) in FIG. 3.

Based on the analysis result in step (S207), if the transmitted information relates to a stored item, the control means 70 controls the input means 10 to receive additional inputted data about the corresponding stored item, and converts the inputted data into corresponding information through the speech recognition module 20, and then stores the converted information in the storage means 50.

Based on the analysis result in step (S207), if the transmitted information is a control command or control information, or if information received through the communication means 80 is a control command, it may be configured that a control corresponding to the control command/information is performed, and a speech corresponding to the performance result is outputted through the display means 30.

Here, the additionally inputted data may include at least one or more data of the names of stored items, storage period, valid period and quantity (S208).

Then, a response message corresponding to the user's speech input or a response message corresponding to the additionally inputted data about the stored item is generated as a speech or text to be outputted through the display means 30.

Here, to generate the response message corresponding to the user's speech input or the response message corresponding to the additionally inputted data about the stored item, at least one or more conversational sentences or words are stored in the storage means 50 in advance. The control means 70 generates a speech or text as an appropriate response message corresponding to the inputted message or an appropriate response message corresponding to the additionally inputted data about the stored item, by using the at least one or more of the conversational sentences or words stored in the storage means 50.

In addition, when the response message corresponding to the speech input or the response message corresponding to the additionally inputted data about the stored items is generated, the control means 70 calculates and displays the inputted storage period or valid period of the stored item. The control means 70 checks whether or not the storage period/valid period of the stored item have expired, and then visually displays expiration information of the storage period or valid period of the corresponding stored item through the display means 30, or outputs as a speech signal through the audio output means 33 on the storage expiration date or valid period expiration date.

The control means 70 checks whether or not the storage period/valid period of the stored item have expired. Considering an expected expiration notification date preset by a user for the storage period/valid period of the stored item, the control means 70 visually displays expiration information of the storage period or valid period of the corresponding stored item through the display means 30, or outputs a speech signal through the audio output means 33 prior to the expected expiration notification date preset by the user from the storage period/valid period of the stored item.

Further, the inputted speech is recognized, and as a result of the recognition, if the inputted speech is food-related information, the food-related information is analyzed. Then, an avatar of a pre-stored shape or gesture having characteristics conforming to the analysis result is generated to be visually displayed through the display means 30 (S209).

In steps (S201) through (S209), the information displayed through the display means 30 may be transmitted to the outside through the communication means 80.

Hereafter, the control means 70 determines the input completion according to whether the user has completed inputting through the input means 10 or whether there is a speech input from the user for a preset time period (S210).

If, as a result of the determination of the step (S210), an input from the user is determined as being continued, the speech input step (S205) proceeds.

If, as a result of the determination of the step (S210), the input from the user is determined to have been completed, the control means 70 stops the information management service and then displays the preset initial screen on the display means 30 (S211).

The operation method of the interactive refrigerator system according to a third embodiment of the present invention will be described in detail with reference to FIGS. 1 and 2.

Figure 5:
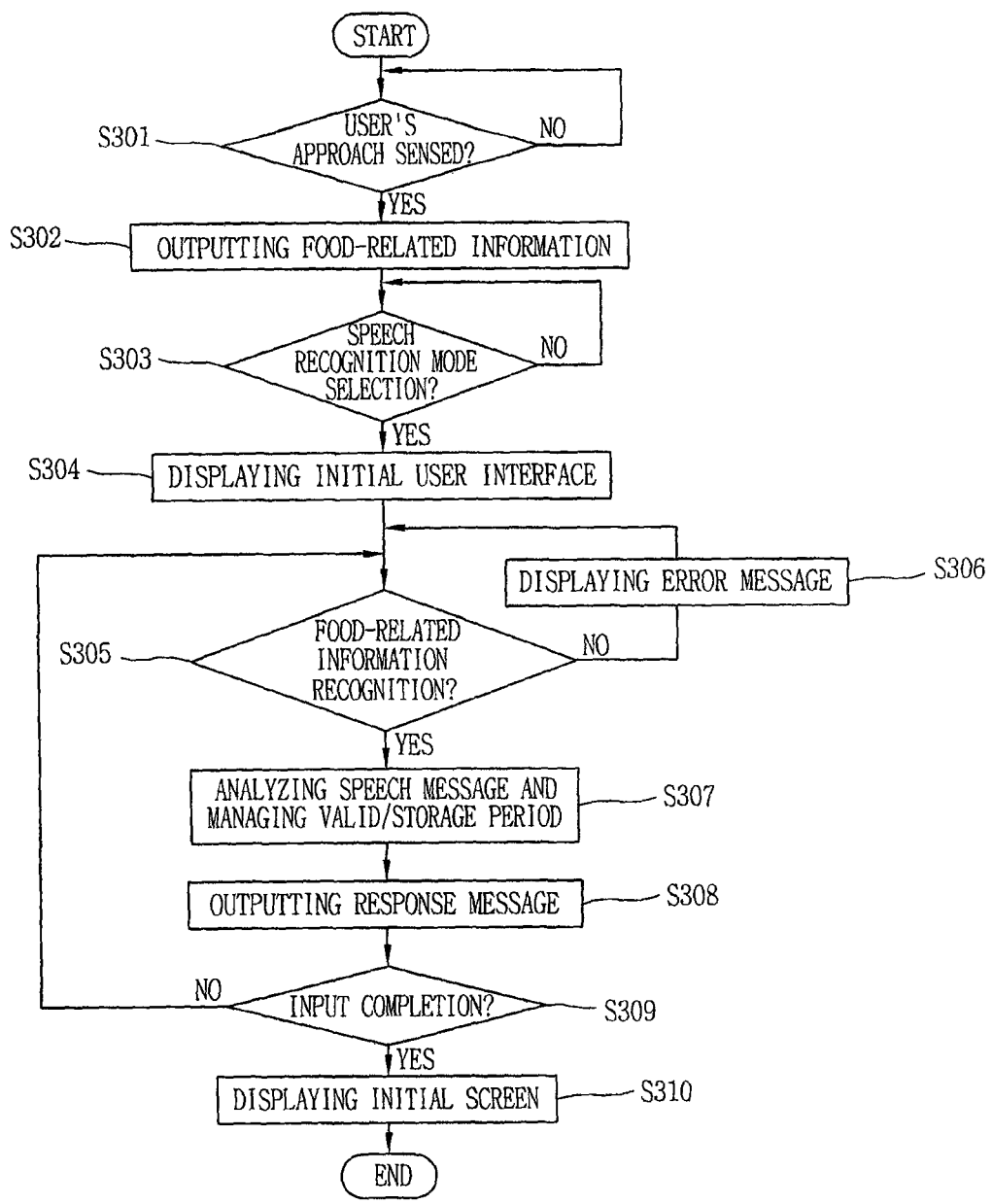
FIG. 5 is a flowchart showing an operation method of an interactive refrigerator system according to a third embodiment of the present invention.

FIG. 5 is a flowchart showing the operation method of the interactive refrigerator system according to the third embodiment of the present invention.

The steps (S301) through (S304) are the same as the steps (S101) through (S104) in FIG. 3.

Hereafter, stored food-related information is inputted to the control means 70 as a speech signal through the microphone 10b.

To check whether or not there is an error in the inputted user's speech, the inputted speech is converted into corresponding information through the speech recognition module 20. If the conversion was able to be performed normally, the user's speech input is determined to have no error and a next step (S307) is then performed. If the conversion was not performed normally, the user's speech input is determined to have an error. The control means 70 displays a text such as <please say that again> to the user through the display means 30, displays the text using an avatar, or outputs a pre-stored speech corresponding to the text (S306) so as to request inputting of a speech from the user again.

Further, the control means 70 may display to the user through a shape or gesture of the avatar, whether or not the user's inputted speech has an error. For instance, it may be configured that a smiling avatar represents that there was no error in the user's inputted speech, and a crying avatar represents that there was an error in the user's inputted speech (S305).

When there was no error in the user's inputted speech, the speech recognition module 20 converts the user's speech into information corresponding to the speech. Based on the thusly converted information, information about the items stored in the refrigerator may be analyzed, and then the analyzed result may be transmitted to the outside through the communication means 80.

In addition, the control means 70 analyzes the information converted by the speech recognition module 20 or the refrigerator-related control command, received from the user through the communication means 80 and then transmitted to the control means 70.

The control means 70 abstracts valid period or storage period from the recognized food-related information, and generates a food-related information list window to display a corresponding food-related information according to whether or not the abstracted valid period/storage period have expired. Then, the control means 70 converts the corresponding food-related information into a speech or text so as to output through the display means 30.

Here, information displayed on the food information list window includes at least one or more of a name of corresponding food, storage period, valid period, quantity, and an avatar representing the corresponding food.

Based on the analysis result, if the transmitted information is a control command or control information, or if information received from the communication means 80 is a control command, it may be configured that a control corresponding to the control command/information is performed and then a speech corresponding to the performance result is outputted from the display means 30 (S307).

Thereafter, a response message corresponding to the speech message for the inputted food-related information is generated as a speech or text so as to be outputted through the display means 30.

Here, to generate a response message corresponding to the inputted speech message, at least one or more conversational sentences or words are stored in the storage means 50 in advance. The control means 70 generates speech or text as an appropriate response message corresponding to the inputted message, by using the at least one or more conversational sentences or words stored in the storage means 50.

In addition, when the response message corresponding to the inputted message is generated, the control means 70 calculates and displays the inputted storage period or valid period of the stored item. The control means 70 checks whether or not the storage period/valid period of the stored item have expired, and then visually displays expiration information of the storage period or valid period of the corresponding stored item through the display means 30, or outputs a speech signal through the audio output means 33 on the storage expiration date or valid period expiration date.

The control means 70 checks whether or not the storage period/valid period of the stored item have expired. Considering an expected expiration notification date preset by a user for the storage period/valid period of the stored item, the control means 70 visually displays expiration information of the storage period or valid period of the corresponding stored item through the display means 30, or outputs a speech signal through the audio output means 33 prior to the expected expiration notification date preset by the user from the storage period/valid period of the stored item.

Further, the inputted speech is recognized, and as a result of the recognition, if the inputted speech is food-related information, the food-related information is analyzed. Then, an avatar of a pre-stored shape or gesture having characteristics conforming to the analysis result is generated to be visually displayed through the display means 30 (S308).

In steps (S301) through (S308), the information displayed through the display means 30 may be transmitted to the outside through the communication means 80.

Hereafter, the control means 70 determines the input completion according to whether the user has completed inputting through the input means 10 or whether there is a speech input from the user for a preset time period (S309).

If, as a result of the determination of the step (S309), an input from the user is determined as being continued, the speech input step (S305) proceeds.

If, as a result of the determination of the step (S309), the input from the user is determined to have been completed, the control means 70 stops the information management service and then displays the preset initial screen on the display means 30 (S310).

Figure 6:
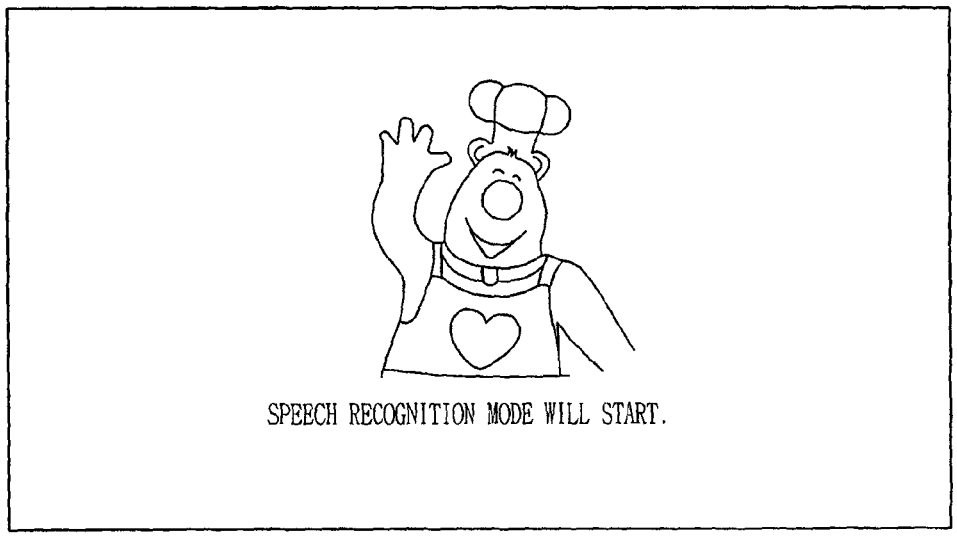
FIGS. 6 and 7 show embodiments of an initial user interface of an information management service in FIGS. 3 through 5.
Figure 7:
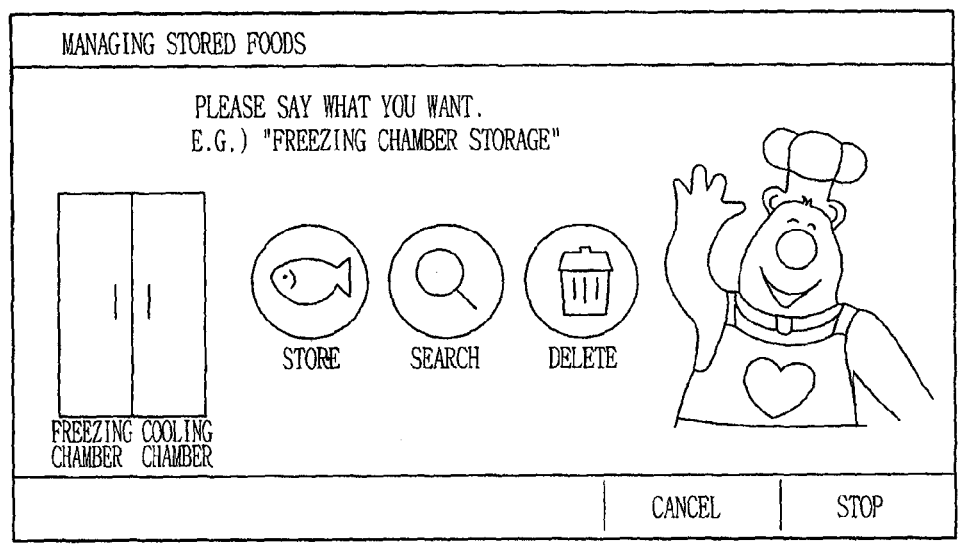

FIGS. 6 and 7 show embodiments of the initial user interface of the information management service according to FIGS. 3 through 5.

Referring to FIGS. 6 and 7, according to the user's input through the speech recognition selection means 14 of the selection means 10a, the control means 70 reads and displays a user interface corresponding to the speech recognition mode from the storage means 50, in steps S103 and S104 in FIG. 3, S203 and S204 in FIG. 4 and S303 and S304 in FIG. 5. The above embodiments intend to manage stored foods as stored items.

FIG. 6 shows that the control means 70 informs a user about a start of the speech recognition mode.

An initial user interface as shown in FIG. 7 may be an initial screen of the information management service or an initial screen of the speech recognition mode. A user can manage information about items stored in a freezing chamber and a cooling chamber. This information management includes functions such as information storage, information search and information deletion. All user interfaces, which will be described below, as well as the initial user interface include instructions on how a user should perform a speech input in what order (command order) in each step. In addition, in the user interface, if the user speaks <cooling chamber storage>, the control means 70 prepares to perform the information storage mode.

Further, a <cancel> button is displayed to cancel a user's speech input, and a <stop> button is displayed to stop a user interface in a current process. In particular, since the <cancel> and <stop> buttons relate to the control information, controls according to each of such buttons are performed. The display means 30 displays a pre-stored speech or text corresponding to the performed control result to the user for the performed control result.

The initial user interface also displays an avatar (bear) to provide the user with feelings of intimacy.

The initial user interface can be selected by a speech or by the selection means 10a.

Figure 8:
FIGS. 8 through 10 show embodiments in an information storage mode.
Figure 9:
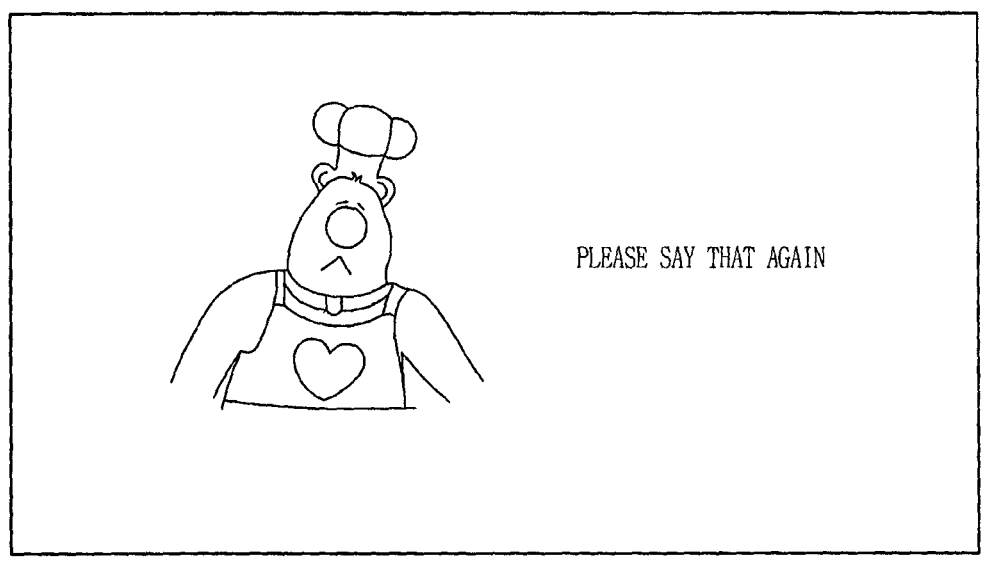
Figure 10:
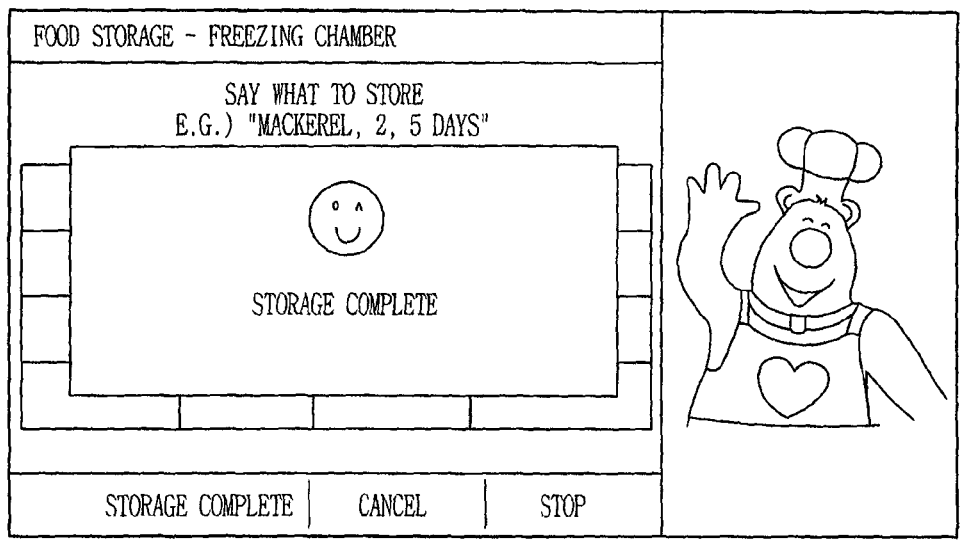

FIGS. 8 through 10 illustrate embodiments of the information storage mode. FIGS. 8 through 10 show the cases when a user selects the information storage mode.

Referring to FIG. 8, as a user inputs <3 salads 3 days Jul. 1, 2007>, <3 carrots 7 days Jul. 8, 2007> and <1 box of strawberries 3 days> in this order, the control means 70 displays such inputted information on the display means 30. For instance, when inputting <3 salads 3 days Jul. 1, 2007>, the control means 70 is inputted the speech <salad> first, and then displays the response message corresponding to the inputted message on the display means 30 by the steps S105 through S111 in FIG. 3, the steps S205 through S208 in FIG. 4 and the steps S305 through S307 in FIG. 5. Sequentially, <3>, <3 days> and <Jul. 1, 2007> follow the same procedure. Here, the user may allow a time interval between each individual words, such that the control means 70 can make sure that the 4 speeches are separately inputted. That is, speeches can be distinguished from each other by the step S113 in FIG. 3, the step S210 in FIG. 4 and the step S309 in FIG. 5. In addition, a user may select to input at least one or more of the storage period or valid period. In other words, both the storage period and the valid period can be inputted, or either the storage period or the valid period can be inputted.

In FIG. 9, in step S106, when the control means 70 cannot properly perform speech recognition from a user, this recognition results in displaying a frowning avatar with an error message such as <please say that again>.

FIG. 10 shows the case when a user has inputted <storage completion> while FIG. 8 is being shown. That is, if the control means 70 obtains the input <storage completion> through the selection means 10a or the microphone 10b, the control means 70 stores the information displayed by the steps S105 through S112 in FIG. 3, the steps S205 through S209 in FIG. 4 and the steps S305 through S308 in FIG. 5 in the storage means 50. Here, the control means 70 requests time-related information about when the information has been obtained or stored from the data/time counting means 40, and then stores the time-related information (e.g., a date and/or time) provided by the date/time counting means 40 along with the displayed information in the storage means 50. The provided time-related information refers to a starting date of storage for a stored item. And, the control means 70 may output the storage completion for the user's input through the audio output means 33. For instance, an audio signal such as <a box of strawberries is stored > may be outputted.

Figure 11:
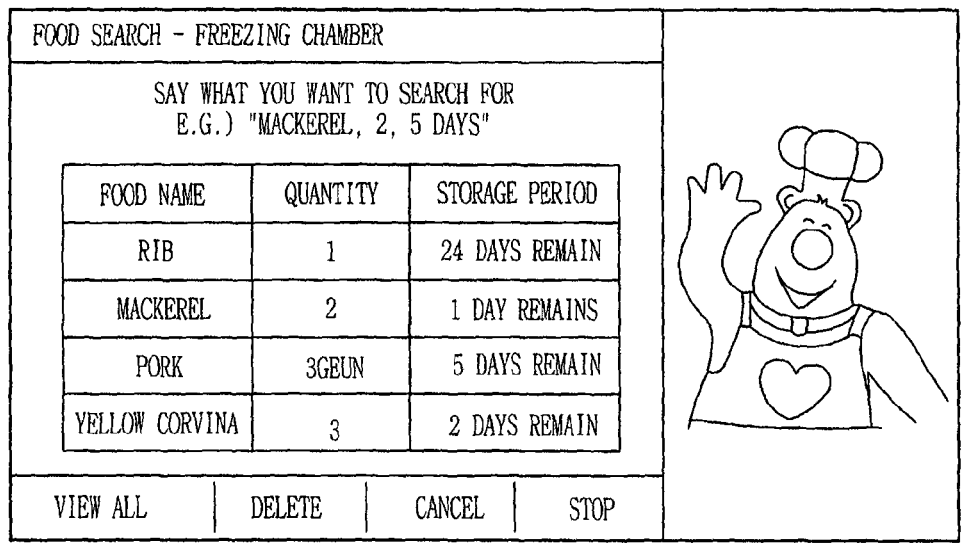
FIGS. 11 and 12 show embodiments in an information search mode.
Figure 12:

FIGS. 11 and 12 illustrate embodiments of the information search mode. FIGS. 11 through 12 show the cases when a user selects the information search mode. That is, in the user interface in FIGS. 6 and 7, embodiments of the information search mode are the type of the user interface displayed by the steps S105 through S112 in FIG. 3, the steps S205 through S209 in FIG. 4 and the steps S305 through S308 in FIG. 5.

As shown in FIG. 11, the control means 70 reads information about the items stored in the storage means 50 and displays such information on the display means 30, by the steps S105 through S112 in FIG. 3, the steps S205 through S209 in FIG. 4 and the steps S305 through S308 in FIG. 5. Here, when calculating and displaying the storage periods of each of the stored items, the control means 70 reads the information about the stored items from the storage means 50 and obtains current date and time (a date and/or time) from the date/time counting means 40, thereby calculating and displaying the storage periods of each of the stored items. The storage period is calculated by subtracting a starting date of storage from the current date.

Further, the control means 70 may display a storage period based on a starting date of storage or based on remaining days from the valid period so as to make the user easily recognize the stored items.

FIG. 12 shows a case that the control means 70 obtains and displays the input such as <mackerel> or <2 mackerels> from the user in FIG. 11, and then outputs detailed information corresponding to such information in the information search mode.

Figure 13:
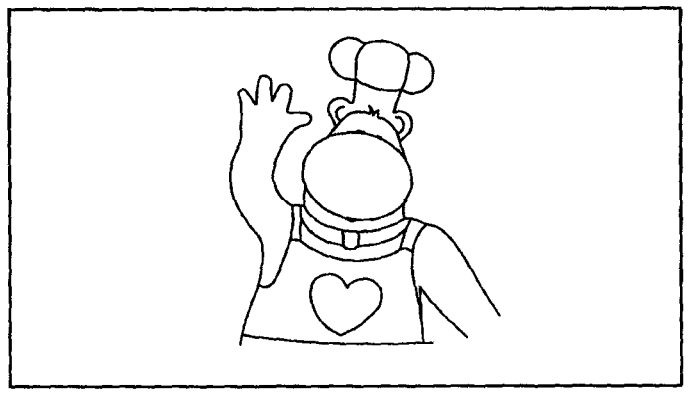
FIGS. 13 and 14 show embodiments in an information notification mode.
Figure 14:
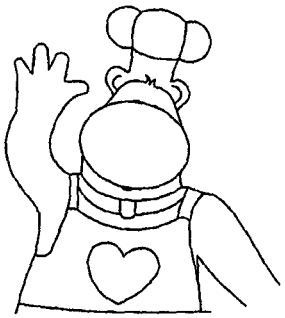

FIGS. 13 and 14 illustrate embodiments of the information notification mode.

FIG. 13 shows that the control means 70 notifies a user about a presence of an item being stored for a long time by using an avatar (having an abnormally big nose) through the display means 30.

FIG. 14 shows that the control means 70 displays information about an item being stored for a long time through the display means 30 in detail.

The information management method of the present invention as described in detail may also be applied to cases of information modification and external transmission of information, and the like as well as storage, search and deletion of information.

Applicability in Industry

As so far described, the present invention allows a user to store and manage the names of stored items and additional information without directly inputting such information to the keyboard and the like, thereby facilitating the information management.

In the present invention, the user can input information by speech, identify the recognition result of the inputted information through an avatar, and check an identification result corresponding to the performance result for the inputted information, thereby enabling the control and information management by speech.

In addition, the present invention can notify information about the stored items to the user in advance through the avatar or by speech, thereby facilitating management of conditions of the stored items by the user.

What is claimed is:

1. An operation method of an interactive refrigerator system, comprising:
    inputting information about stored foods by a speech signal, and displaying information about the stored items corresponding to the input speech signal;
    abstracting a valid period from the information about the stored items, and checking whether or not the abstracted valid period is expired based upon the input speech signal; generating and displaying a food information list window to display corresponding food-related information based on whether the valid period is expired based upon the input speech signal; and
    if a user's approach is sensed, converting information about food having an expired valid period into a preset speech signal and outputting the converted information to an audio output means of the refrigerator.

2. The method of claim 1, wherein the food information list window comprises at least one or more of the names of the stored items, quantity, storage period and valid period.

3. The method of claim 1, further comprising:
    recognizing the speech signal, analyzing the food-related information if the recognized speech signal is the food-related information, and generating and displaying an avatar of a pre-stored shape or gesture having characteristics conforming to the analysis result.

4. The method of claim 1, further comprising:
    converting the speech signal outputted from the refrigerator into a wireless or wired communication signal, and transmitting the converted signal to a user; or
    receiving a refrigerator-related control command from the user through a wireless or wired communication signal, and inputting the received control command to the refrigerator.

* * * * *